Figure 1:
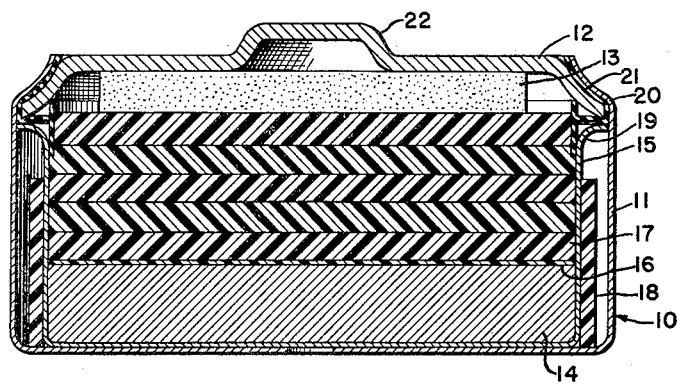

Dec. 21, 1954  M. B. GOLDBERG ET AL  2,697,736
RECHARGEABLE LEAD DRY CELL
Filed March 25, 1954

INVENTORS
M. B. GOLDBERG
H. B. REED, JR.

BY

ATTORNEYS

United States Patent Office 2,697,736
Patented Dec. 21, 1954

2,697,736

RECHARGEABLE LEAD DRY CELL

Monroe B. Goldberg, Hyattsville, and Herbert B. Reed, Jr., Silver Spring, Md., assignors to the United States of America as represented by the Secretary of the Navy Application March 25, 1954, Serial No. 418,798

6 Claims. (Cl. 136—6)

(Granted under Title 35, U. S. Code (1952), sec. 266)

The invention described herein may be manufactured and used by or for the Government of the United States of America for governmental purposes without the payment of any royalties thereon or therefor.

This invention relates to a dry cell battery and more particularly to a rechargeable cell displaying low voltage characteristics.

More particularly, the invention relates to a lead dry cell which may be recharged many times and of a character having a long shelf or storage life of at least two years. Heretofore, batteries of a rechargeable character have only been known in batteries generally falling in the wet cell category. Attempts which have been made to reactivate dry cells by passing a direct current therethrough have not proved completely successful, in that such a procedure is only useful for one or a very few recharge cycles and not at all if the cell has become completely discharged. In most instances, prior rechargeable batteries have incorporated an acid-type electrolyte, in a wet cell device, while the instant invention utilizes an alkaline electrolyte. The instant invention provides a source of low voltage of approximately .9 volt having a high capacity per unit volume, displays long storage life even at elevated temperatures up to 160° F., and further provides a relatively constant voltage characteristic with load.

Heretofore, it has been attempted to use series resistors of both the linear and non-linear varieties to provide a voltage drop when the normal cell voltage has been too high for direct application to devices requiring a lower operating voltage. Voltage divider arrangements have been used in some cases but a great deal of power is lost when using this method of deriving a low voltage from a cell. Series resistors, whether of the linear or non-linear variety, effectively reduce the dynamic range of the units derived from the energy source.

It is a feature of this invention to provide a low voltage source of potential, which is of a dry cell nature and which may be recharged many times during the life thereof.

One object of the invention is to provide a cell with a long shelf or storage life of at least two years.

Another object of the invention resides in the provision of a cell with a low temperature coefficient at the said low voltage of approximately .9 volt at no-load or under light loads, and which will recover very rapidly even after subjection to heavy current drains, thereby providing rapid voltage stabilization under varying and intermittent load conditions.

In correlation with the immediately preceding object, it is a further object to provide a cell which will operate uniformly and dependably with only slight variations in voltage under elevated and lowered temperatures, due to the said low temperature coefficient thereof.

It is another object of the invention to proivde a dry cell having a high capacity per unit volume.

It is also an object to provide a dry cell which may be stored at elevated ambient temperatures up to 160° F. with only slightly reduced capacity.

Another object resides in providing a cell displaying less loss in capacity at low temperatures than dry cells heretofore or now in general use.

Another object resides in the provision of a cell which may be stored in a discharged condition and subsequently charged after long or short periods of time.

It is still another object to provide a rechargeable dry cell of low voltage characteristics which is capable of operating in any orientation.

It is a further object to provide a cell that will not produce gas during discharge or charge.

Another object lies in providing a rechargeable cell which may be charged in series or parallel with other similar cells.

Figure 2:
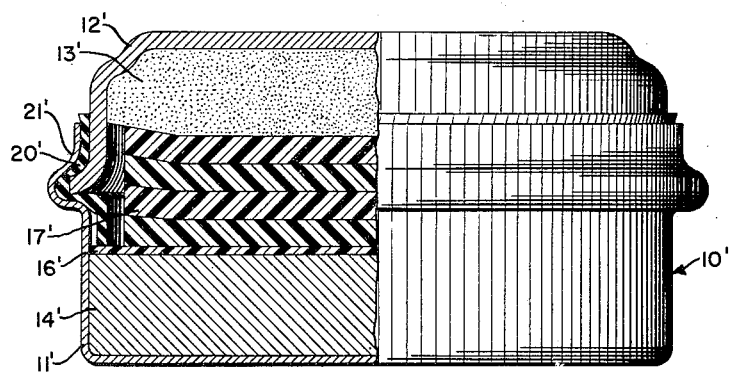

Other objects and many of the attendant advantages of this invention will be readily appreciated as the same becomes better understood by reference to the following detailed description when considered in connection with the accompanying drawing wherein:

Fig. 1 is a view in vertical section of a dry cell made according to one embodiment of the instant invention; and Fig. 2 is a view in elevation with parts broken away and in section, of a cell constructed according to a preferred embodiment of the instant invention.

Referring now to Fig. 1 of the drawing there is shown a rechargeable battery cell shown generally at 10 comprising a lower container or casing 11 and a cover or cap for the container at 12. The internal components of the cell are disposed generally within the outer container 11 and assembled within the inner container 15 for the cathode pellet 14.

The cathode pellet 14 of silver oxide [$Ag_2O$] powder is pressed into a consolidated mass with a small amount of graphite mixed therewith to increase the conductivity. This cathode is pressed in the conducting metal container 15 which serves as one electrode of the battery. Disposed in immediate contact with the cathode pellet 14 is a barrier layer 16 of either Synpor [microporous polyvinyl chloride], parchment paper, or any similar unreactive microporous material. The balance of the inner container 15 is filled with an absorbent layer 17 of alpha cellulose or similar unreactive absorbing material or under certain conditions this absorber may be omitted and the barrier 16 functions in lieu thereof. This barrier layer contains an alkaline electrolyte hereinafter described with greater particularity.

The pressed anode pellet 13 is of powdered lead or lead amalgam and is in contact with the metal cover which presses against the anode pellet to provide contact therebetween. If desired the inner surfaces of the cover 12 may be lead plated to increase the conductivity of the contact area thereof. An upset portion is provided at 22 to function as the second electrode of the cell.

Disposed in the space between the inner container 15 and the outer vertical walls of the container 11 is an absorbent material generally indicated at 18. The upper portion of this inner container 15 is flared outwardly at 19 to a diameter permitting reception within the container 11 prior to crimping thereof as indicated at 20. Prior to this crimping of the upper portion of container 11 at 20, a seal element 21 of rubber material which is pre-shaped to conform generally to the contour of the outer flange of cover 12, is disposed between this cover 12 and the container 11. The container lid is thereafter set or crimped to permanently seal the battery cell. This rubber seal element 21 additionally provides an electrical insulation between the portion of the container 11 providing the cathode and the top portion 12 which is in electrical contact with the anode pellet 13.

The construction of the cell 10' of Fig. 2 is generally similar to that of Fig. 1 except that the inner container 15 of Fig. 1 has been eliminated in the construction of the cell of Fig. 2 and the cathode pellet 14' and anode pellet 13' are pressed into the container 11' and cap 12' respectively. The barrier layer 16' and the alpha cellulose absorbers 17' containing the electrolyte are disposed between the anode 13' and cathode 14'. A shaped rubber gasket 21' is disposed between the cap 12' and lower container 11' to provide a protective seal and electrical insulation between these two parts. These closures are sealed thereafter by crimping as shown at 20'.

The electrolyte incorporated in the cell may utilize plumbite or plumbate compounds to retard anodic corrosion. This is an optional feature. The device advantageously may be manufactured or assembled in the discharged state using finely divided silver and lead oxide which is primarily litharge for storage in a discharge condition and then be charged before use. Alternatively silver peroxide [$Ag_2O_2$] may be used instead of silver oxide [$Ag_2O$] to give a higher capacity per unit volume provided a slightly higher initial voltage as for example .3 volt higher is not objectionable. The capacity and operation of the cell may be improved by discharging and recharging several times.

The cell operates to produce electrical energy by the chemical action of lead and silver oxide and/or silver peroxide when the circuit is closed. The barrier prevents migration of the solid particles, thus helping to provide a long storage life. The conductivity of the silver oxide or silver peroxide cathode may be increased by varying the amounts of graphite admixed therewith or by electroforming threads of silver within the pellet. Alternative methods of construction will appear to those skilled in the art and may include any other type of microporous barrier that is not oxidized. A gel or some other type of absorber may be used in place of alpha cellulose or it may be constructed even without absorber layers 17 or 17' with the Synpor layer 16 or 16' forming both the barrier and absorber. The electrolyte of the cell may be a hydroxide of potassium, sodium, lithium, or of other alkaline or alkaline earth hydroxides in varying proportions. The shelf life of the cell may be increased as heretofore stated by the addition of plumbate or plumbite compounds to the electrolyte.

Also it is within the scope of the instant invention to utilize a lead sheet or a wound corrugated or straight lead ribbon as a substitute for the pressed powder, for the anode as is well known in the art. An absorber material such as alpha cellulose may be used in contact with this ribbon. The sealing gasket may be of any good insulating plastic or other material such as neoprene.

Up to 25% of mercury by weight may be amalgamated with the lead anode to produce a firmer pellet with better contact and better performance. Also perforated joined lead or lead amalgam plates may be used for the anode in lieu of the pressed pellets.

It is thus apparent that a new rechargeable dry cell which is non-gassing and which may be recharged many times and provides a long shelf life has been disclosed.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A rechargeable dry cell comprising a container, a cathode pellet of compacted silver oxide disposed within said container, a microporous absorbent barrier layer containing an alkaline hydroxide electrolyte and disposed in contact with one surface of said cathode pellet, a porous lead anode pellet superposed in contact with said barrier layer, a closure element for said container in electrical contact with said anode pellet and means providing a seal between said closure element and said container of a character to provide electrical insulation therebetween.

2. A dry cell of the character of claim 1 in which the anode pellet material includes lead amalgam.

3. A rechargeable dry cell of a character providing a voltage of substantially .9 volts, comprising an anode pellet of compacted powdered lead, a cathode of an oxide of silver, a conducting metal container, said cathode being disposed in said container and in electrical contact therewith, a microporous absorbent barrier element disposed in contact with one face of said anode pellet, and adapted to contain an alkaline electrolyte, said barrier further being disposed in sandwich relation between said anode and cathode, an electro-conductive container closure means having a portion thereof in electrical contact with said anode, and an electrical insulating gasket means disposed in sealing relation between the container and the closure means.

4. A dry cell of the character of claim 3 additionally characterized by the inclusion of a small amount of graphite mixed with the oxide of silver cathode to increase the conductivity thereof.

5. A rechargeable dry cell of a non-gassing character comprising a metallic container, a cathode pellet of consolidated oxide of silver having a small amount of graphite mixed therewith and compressed therein, means for closing said container, an anode pellet of compressed powdered lead and lead amalgam disposed in said container closing means and in electrical contact therewith in a manner to provide a first electrode of said cell, said container being in contact with the cathode to provide a second electrode of the cell, an unreactive microporous barrier layer disposed in contacting relationship with said cathode, an absorber mass disposed between said barrier layer and said anode pellet and in mutual contact therewith, said mass containing an alkaline electrolyte, and an electrical insulating seal disposed between said container and said closing means in a manner providing electrical insulating between said anode and cathode thereby providing an enclosed construction for said dry cell.

6. A chargeable dry cell of a character adapted for manufacture in a discharged condition which may subsequently be charged and recharged after successive cycles of discharge, comprising a metallic container, a cathode pellet of consolidated oxide of silver compressed therein, means for closing said container, an anode pellet of compressed litharge and lead pellets disposed in said container closing means and in electrical contact therewith in a manner to provide a first electrode, said container being in contact with the cathode pellet to provide a second electrode, an unreactive absorber-barrier layer disposed in contacting relation with said cathode, an absorbent mass disposed between said barrier layer and said anode pellet and in mutual contact therewith, said mass containing an electrolyte of KOH, and an electrical insulating seal disposed between said container and said closing means in a manner to electrically insulate said anode and cathode thereby providing an enclosed construction for said dry cell.

References Cited in the file of this patent

UNITED STATES PATENTS

| Number | Name | Date |
| --- | --- | --- |
| 2,636,062 | Colton | Apr. 21, 1953 |